United States Patent [19]

Bellucco et al.

[11] Patent Number: 5,930,465
[45] Date of Patent: Jul. 27, 1999

[54] PRINTING SYSTEM WITH ENHANCED PRINT SERVICE CAPABILITY

[75] Inventors: Thomas M. Bellucco, Webster; Paul J. Bottazzo, Rochester, both of N.Y.

[73] Assignee: Xerox Corporation, Stamford, Conn.

[21] Appl. No.: 08/753,571

[22] Filed: Nov. 26, 1996

[51] Int. Cl.⁶ .......................... G06T 15/00; G05B 11/00
[52] U.S. Cl. .......................... 395/114; 395/114; 395/115
[58] Field of Search ...................... 395/114, 115, 395/200.15, 200.19, 200.31, 200.44, 200.47, 200.5, 200.79, 736, 737, 739, 741, 500, 112, 155, 101, 200; 376/61, 80, 94.2, 85.6

[56] References Cited

U.S. PATENT DOCUMENTS

| | | | |
|---|---|---|---|
| 5,113,494 | 5/1992 | Menendez et al. | 345/502 |
| 5,113,496 | 5/1992 | McCalley | 395/200 |
| 5,128,878 | 7/1992 | Gore et al. | 395/162 |
| 5,179,637 | 1/1993 | Nardozzi | 395/114 |
| 5,220,674 | 6/1993 | Morgan et al. | 395/200.53 |
| 5,313,581 | 5/1994 | Giokas et al. | 395/200 |
| 5,455,950 | 10/1995 | Vasseur et al. | 395/700 |
| 5,483,653 | 1/1996 | Furman | 395/650 |
| 5,699,523 | 12/1997 | Li et al. | 395/200.15 |
| 5,797,005 | 8/1998 | Bahls et al. | 395/680 |

*Primary Examiner*—David K. Moore
*Assistant Examiner*—Douglas Tran
*Attorney, Agent, or Firm*—Gary B. Cohen

[57] ABSTRACT

An improvement for a printing system with a first document job server communicating with a second document job server is provided. As contemplated, a document job is provided to the first document job server and a document processing system communicates with the second document job server. The improvement comprises a job queue communicating with the first document job server for storing the document job, and a first module communicating with the job queue of the first document job sever for retrieving a copy of the document job from the job queue in response to a determination, by the first module, that the document job resides in the job queue. The improvement further includes a second module communicating with both the first module and the document processing system, the second module creating a print ready version, from the copy of the document job, for submission to the document processing system.

4 Claims, 10 Drawing Sheets

Typical ASCII Job Ticket

| | |
|---|---|
| %XRXbegin: | 1.31 |
| %XRXdisposition: | PRINT |
| %XRXsenderName: | |
| %XRXtitle: | PostScript File |
| %XRXcopyCount: | 1 |
| %XRXpaperType-size: | 216  279 |
| %XRXdocumentPaperColors: | white |
| %XRXpaperType-opacity: | opaque |
| %XRXpaperType-preFinish: | Plain 0 0 |
| %XRXrecipientName: | |
| %XRXrequirements: | simplex |
| %XRXsignature: | FALSE |
| %XRXsourceFile: | . . . |
| %XRXdeleteSource: | FALSE |
| %XRXxImageShift: | 5 |
| %XRXyImageShift: | 0 |
| %XRXend | |

*FIG. 3*
*PRIOR ART*

Configuration File

%%BEGIN: 1.01
%%SERVERID: 99999_NumericAUassignedNumber:
%%XeroxServerName: ServerNameUpTo45Chars
%%XeroxPrintServerName: PrintServerName
%%ServerName: ServerNameUpTo45Chars
%%RemoteQ: NovellQname
%%QueuePriority: 1
%%LocalQ: NovellQname
•
•
•
%%RemoteQ: NovellQname
%%QueuePriority: 2
%%LocalQ: NovellQname
%%ServerName: ServerNameUpTo45Chars
%%RemoteQ: NovellQname
%%QueuePriority: 10
%%LocalQ: NovellQname
•
•
•
%%RemoteQ: NovellQname
%%QueuePriority: 1
%%LocalQ: NovellQname
•
•
•
%%End

---

> Server names and id should be in consecutive pairs.
> Remote and local queue names should be in consecutive pairs.
> Queues are associated with the preceding server.
> Any unrecognized lines in the file are treated as comments.
> There can be iterations of the server keyword with multiple queues.

*FIG. 7* and the print job is automatically retrieved by the second document job server to provide the service which, in actuality, was not available at the first document job server.

PRINTING SYSTEM WITH ENHANCED PRINT SERVICE CAPABILITY

BACKGROUND

This invention relates generally relates to a printing system having a first document job server in communication with a second document job server and, more particularly, to an arrangement in which a print job is provided to the first document job server with the expectation that the print job will be processed in accordance with a selected service and the print job is automatically retrieved by the second document job server to provide the service which, in actuality, was not available at the first document job server.

Personal computers have become commonplace on the desks of most office workers. Typically, much of the work product of such computers is intended to be transformed into hardcopy via a printer using digital imaging technology. A typical printer configuration for this purpose comprises a dedicated printer coupled to the personal computer ("PC"). However, printers used for this purpose are typically small laser printers which have limited functions and features such as a limited tray capacity which restricts the number and types of copy sheets that can be used to make prints on, or which do not have a finishing capability, etc.

On the other hand, larger high speed laser printers normally have a great deal of finishing and copy sheet capability which would allow the PC user to have, for example, custom printing and finishing of his work product, an option which for many PC users would be highly desirable. In practice, the PCs can be used advantageously with a network printing system of the type combining a number of client inputs, such as the PCs, or the like, and one or more printer outputs. In one example of such network printing systems, a client at one of the inputs sends electronic documents that comprise a job over a local area network (LAN) to one of the printers selected for printing of the job. In particular, LANs provide a means by which users running dedicated processors are able to share resources such as printers, file servers and scanners. Integration of shared resources has been a problem addressed by LAN managers. LAN managers have made different network protocols transparent to devices running different network protocols LANs also have a variety of print drivers emitting different page description languages (PDLs), which are directed to specific print devices.

In network printing systems of the type referred to immediately above, the client inputs are typically interfaced with the printer outputs by way of a print server. The following patents represent examples of servers suitable for use with printing systems:

U.S. Pat. No. 5,113,494

Patentees: Menendez et al.

Issued: May 12, 1992

U.S. Pat. No. 5,179,637

Patentee: Nardozzi

Issued: Jan. 12, 1993

U.S. Pat. No. 5,220,674

Patentees: Morgan et al.

Issued: Jun. 15, 1993

U.S. Pat. No. 5,113,494 discloses an arrangement in which a plurality of nodes communicate with one another by way of a local area network communication line. In one example, a hardcopy of a job could be processed at a scan node while an electronic copy of the same job could be processed at a print node.

U.S. Pat. No. 5,179,637 discloses a system for distributing print jobs received from a print image data source among a set of print engines and associated processors. One or more data files containing the information required to print one or more copies of an image are submitted to a scheduler and the scheduler interprets the job control information in the data file(s) for the image and passes the data files(s) to an image processor.

U.S. Pat. No. 5,220,674 discloses a local area print server which functions in cooperation with a plurality of clients and a plurality of printers to facilitate communication between the clients and the printers. The server includes various subsystems, such as a status collection subsystem that maintains a wide range of state information regarding virtually every subsystem with which the server communicates. The status collection subsystem includes a notification facility which sends reports of printing system status changes or events to appropriate network components internal and external to the local area print server that would have an interest in knowing them.

A print server particularly well suited for use with a high speed printing apparatus including a wide range of functionality is disclosed in the following patent:

U.S. Pat. No. 5,483,653

Patentee: Furman

Issued: Jan. 9, 1996

The '653 patent, which includes an extensive discussion of network printing art, is directed toward an arrangement for parsing a file specification.

The '653 and '674 patents illustrate an arrangement in which multiple clients access one or two printing machines. In actuality, thousands of clients may, under certain circumstances, wish to avail themselves of a singe printer on a relatively regular basis. This is particularly true in those instances where the printing machine or machines offer a large range of features and thus an exceptionally high level of functionality. It is contemplated that in certain settings, such as universities, thousands of clients may seek to use a single printing machine over a relatively short interval. Generally, a print server must be configured for each user that employs that print server on a relatively regular basis. Hence, for a highly used printing machine, it may be necessary to configure the corresponding print server for thousands of clients/users This configuration requirement can, nonetheless, result in an overtaxing of the print server's resources and thus impair its response. It would be desirable to provide an arrangement in which many users can use a print server on a relatively regular basis without the need to configure each and everyone of those users.

SUMMARY OF THE INVENTION

In accordance with the disclosed invention there is provided an improvement for a printing system with a first document job server communicating with a second document job server. As contemplated, a document job is provided to the document job server and a document processing system communicates with the second document job server. The improvement comprises a job queue communicating with the first document job server for storing the document job, and a first module communicating with the job queue of the second print sever for retrieving a copy of the document job from said job queue in response to a determination, by said first module, that the document job resides in said job queue. The improvement further includes a second module communicating with both said first module and the document processing system, said second module creating a print ready version, from the copy of the document job, for submission to the document processing system.

BRIEF DESCRIPTION OF THE DRAWINGS

FIG. 3 is a representation of a prior art format for an electronic job ticket;

FIG. 7 is a representation of a configuration file suitable for, among other things, mapping the queues of the arrangement of FIG. 6 with one another;

DESCRIPTION OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
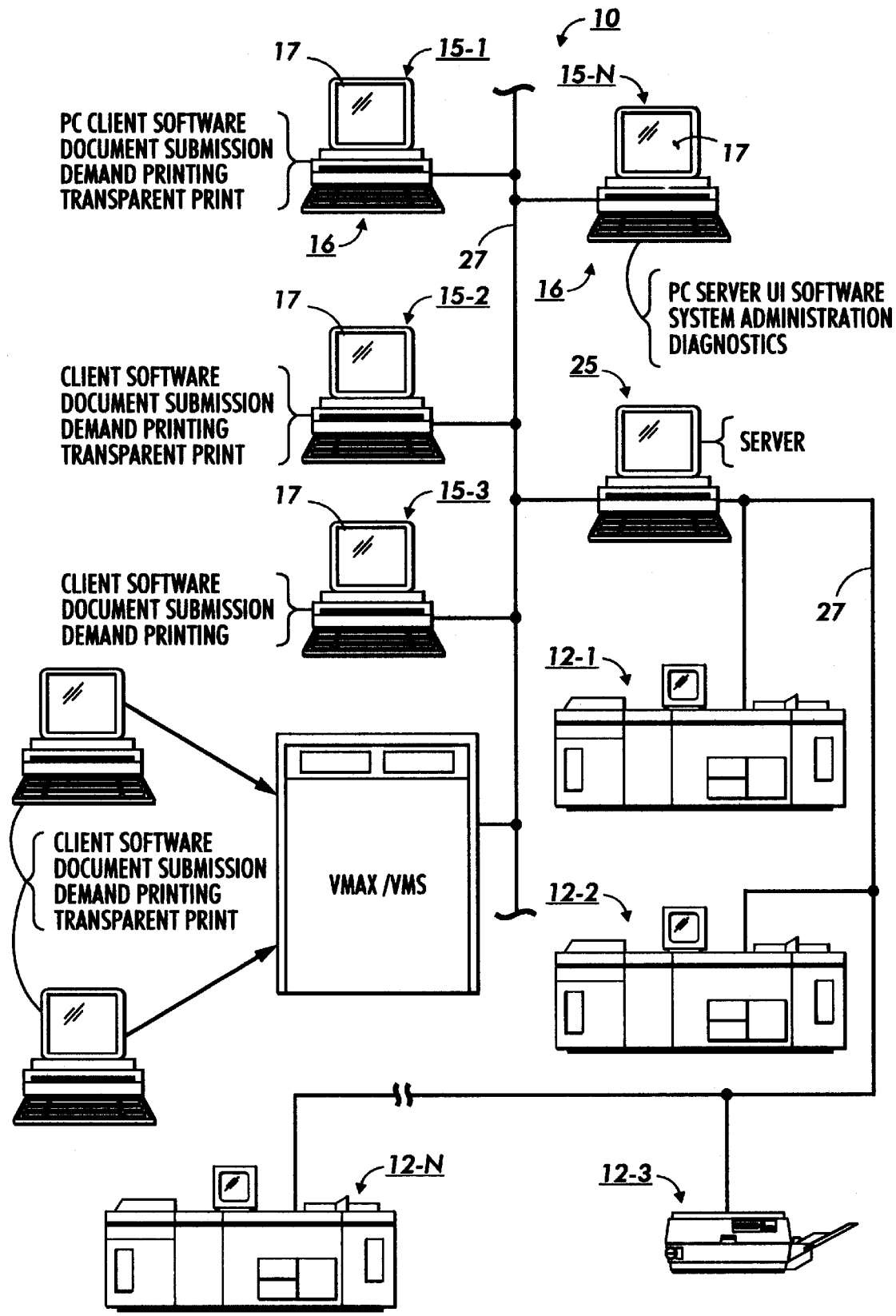
FIG. 1 is a schematic, elevational view of a prior art network printing network printing system.

Referring to FIG. 1, there is shown a network document processing system 10 of the type adapted to incorporate the present invention. Processing system 10 comprises a plurality of printers 12-1, 12-2, 12-3, . . . 12-N for processing print jobs and making prints in accordance with the job programming instructions for each job printed. Each of printers 12-1, 12-2, 12-3, 12-N may be any suitable printer capable of producing prints on a print media such as paper from video image signals and may, for example, comprise laser printers, ink jet printers, digital copiers, highlight or full process color printers, ionographic printers, combinations of the aforesaid devices, etc. In system 10, where multiple printers are integrated into a network processing system, individual printers typically have different document processing capabilities as will appear. As used herein, printers 12-1, 12-2, 12-3, . . . 12-N include virtual printers of the type disclosed by U.S. Pat. Nos. 5,371,837 and 5,450,571.

System 10 provides print processing for various workstations or clients 15-1, 15-2, 15-3, . . . 15-N. Clients 15-1, 15-2, 15-3, . . . 15-N, which may be remote and/or on site, are operatively coupled to printers 12-1, 12-2, 12-3, 12-N through server 25 as will appear. As will be appreciated, while only one server and a limited number of document processing apparatuses are shown in FIG. 1, the preferred embodiment contemplates the use of as many servers and document processing units as required to meet the demands of the users of the system. Clients provide the electronic documents that are the source of the print jobs and for this purpose individual ones or all of clients 15-1, 15-2, 15-3, . . . 15-N may have a document scanner, disk input, keyboard, fax, etc. for generating the electronic documents that comprise the job to be printed. Clients 15-1, 15-2, 15-3, . . . 15n have a User Interface (UI) 16 with interactive screen 17 enabling programming selections for print jobs to be made, screen 17 displaying the various programming selections available in the form of a job ticket as will appear. Printers 12-1, 12-2, 12-3, . . . 12-N, clients 15-1, 15-2, 15-3, . . . 15-N, and server 25 are operatively interconnected by network or communication channels 27.

Figure 2:
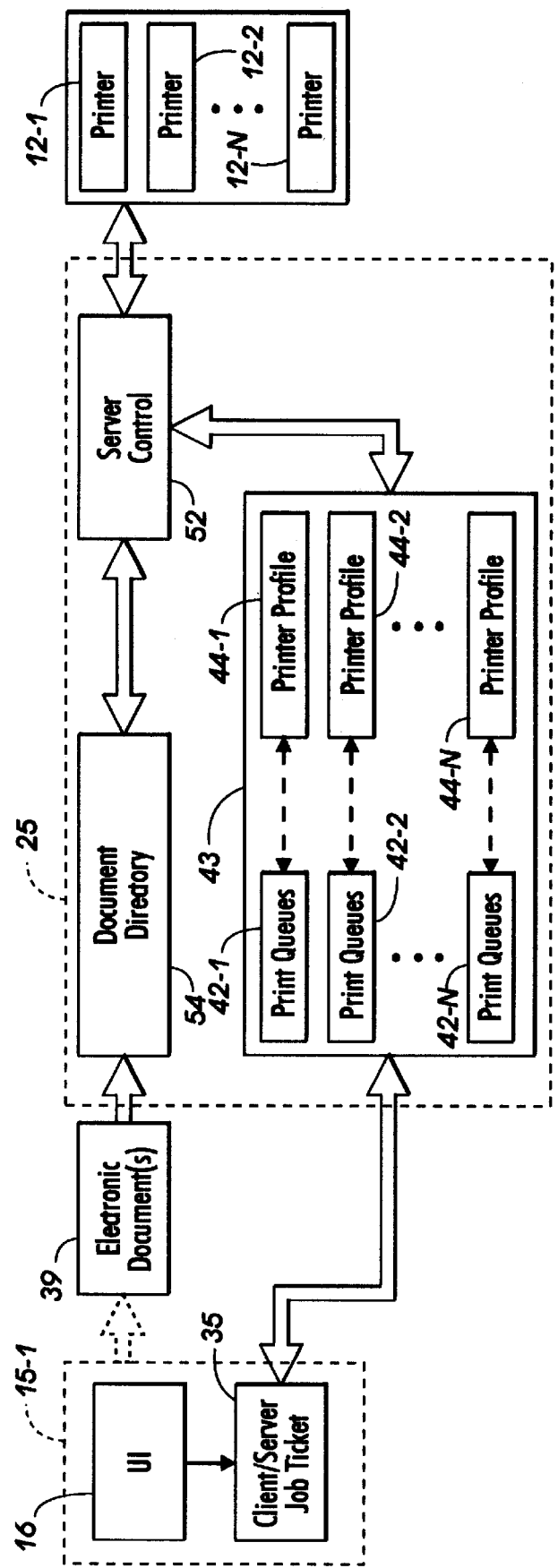
FIG. 2 is a partial, schematic, block diagram of the prior art network printing system of FIG. 1.

Referring to FIG. 2, the relationship of a single client, such as client 15-1, to the server 25 is shown in further detail. In the illustrated embodiment of FIG. 2, the client 15-1 includes one of the UIs 16 and an electronic job ticket 35, which job ticket 35 permits the user to program a print job for transmission to the server 25. In general, the job ticket 35 includes information relating to attributes that characterize a document job. More particularly, the attributes typically include job level attributes (e.g. set quantity, copy count, finishing requirements, plex and page numbering), page level attributes (e.g. stock color separation information, image quality, reduction/enlargement and sides to be imaged), and image level attributes (e.g. size of image, color of image, location of image relative to a page). In one example, electronic document(s) 39, which includes image and attribute related information, is transmitted from the client 15-1 to the server 25.

Referring to FIG. 3, the client/server job ticket 35 may assume an ASCII format. Additionally, by employment of suitable client UI interface dialog software, print job selections may be displayed on the screen 17 of the UI 16 so that the user can be apprised of which printing selections are available for programming a print job. The disclosures of U.S. Pat. Nos. 5,450,571 and 5,467,434 describe, in detail, arrangements suitable to generate job tickets for network printing systems employing multiple queues.

Referring again to FIG. 2, the server 25 includes one or more queues 42-1, 42-2, . . . 42-N, the queues (e.g. print queues) 42 being provided, for selection by the user, on a section or file 43. Each of the queues 42 is mapped to one of configuration files or profiles (e.g. print profiles) 44-1, 44-2, . . . 44-N. Each of the printer profiles includes a list of printer properties, the properties, in one example, being arranged advantageously to describe the combinations of job selections available at a selected one of the printers or family document processing units 12.

Each of the print queues 42 is associated with one or more of the document processing units or printers 12. It should be recognized that there may be plural queues for the same printer, as in the case where virtual printers are provided. Accordingly, in a second example, a printer (referred to herein as virtual printer) may be set up to provide different printer functions, with a corresponding print queue and profile provided for each different printer setup.

Referring still to FIG. 2, preferably, the electronic documents 39 are placed in a document directory 54. In one example, the server control 52 combines a set of documents 39 with a corresponding combination of print job selections to form a document job. One example of a server processor capable of combining a set of electronic documents, such as a print data (page description language) file and a corresponding combination of print job selections, such as a job ticket, into a job file for printing can be found in U.S. Pat. No. 5,226,112 to Mensing et al. (Issued: Jul. 6, 1993) Other arrangements well suited for managing jobs on a network level can be found in U.S. Pat. Nos. 5,113,494 (disclosing a server processor suitable for RIPing a document), 5,220,674 (disclosing a server with various levels control as well as database with attendant management), and 5,483,653 (disclosing a server with a parser and storage).

Figure 4:
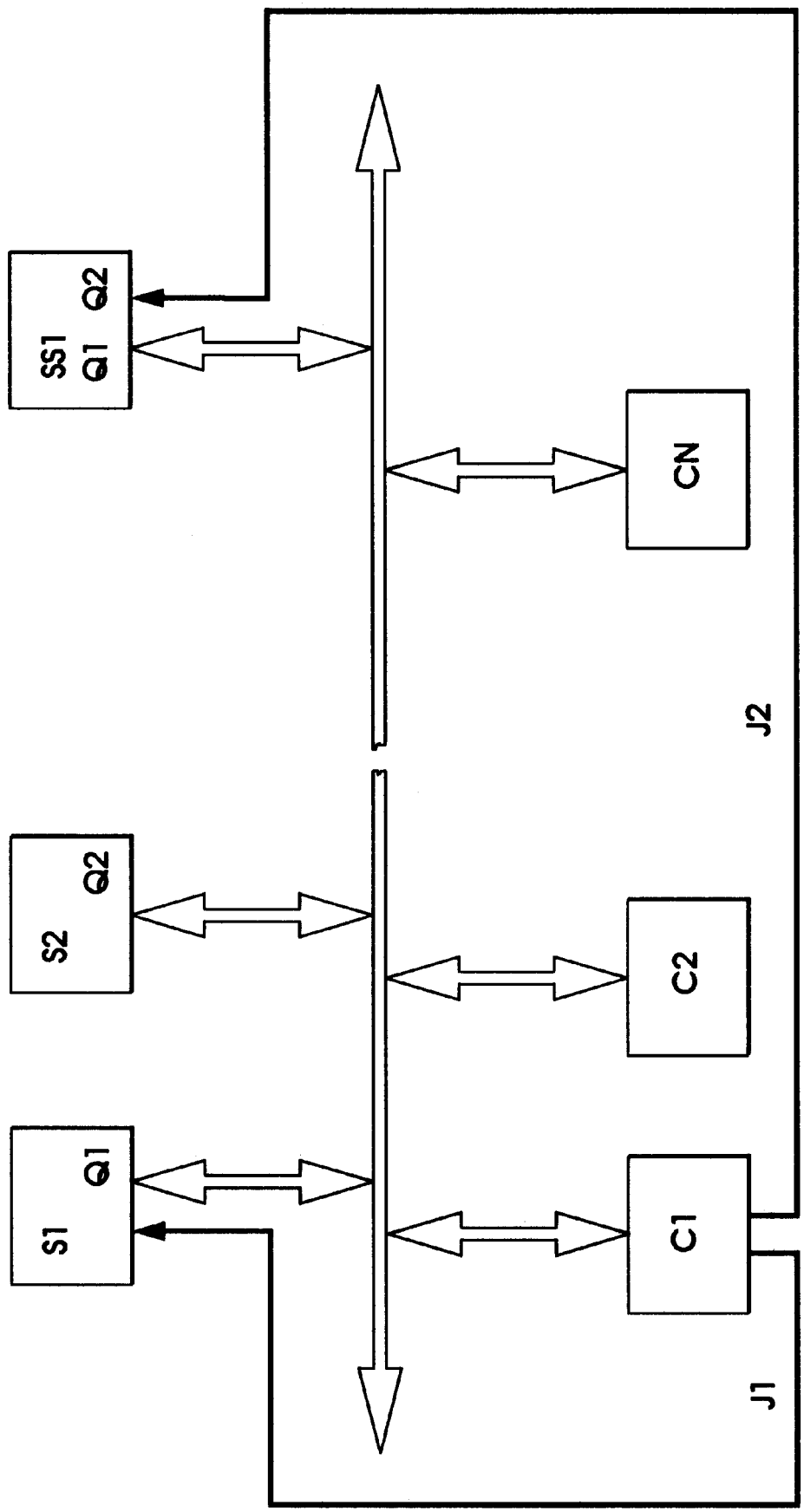
FIG. 4 is block diagram corresponding with an exemplary prior art implementation of a local area network (LAN) including a plurality of both clients and servers.
Figure 5:
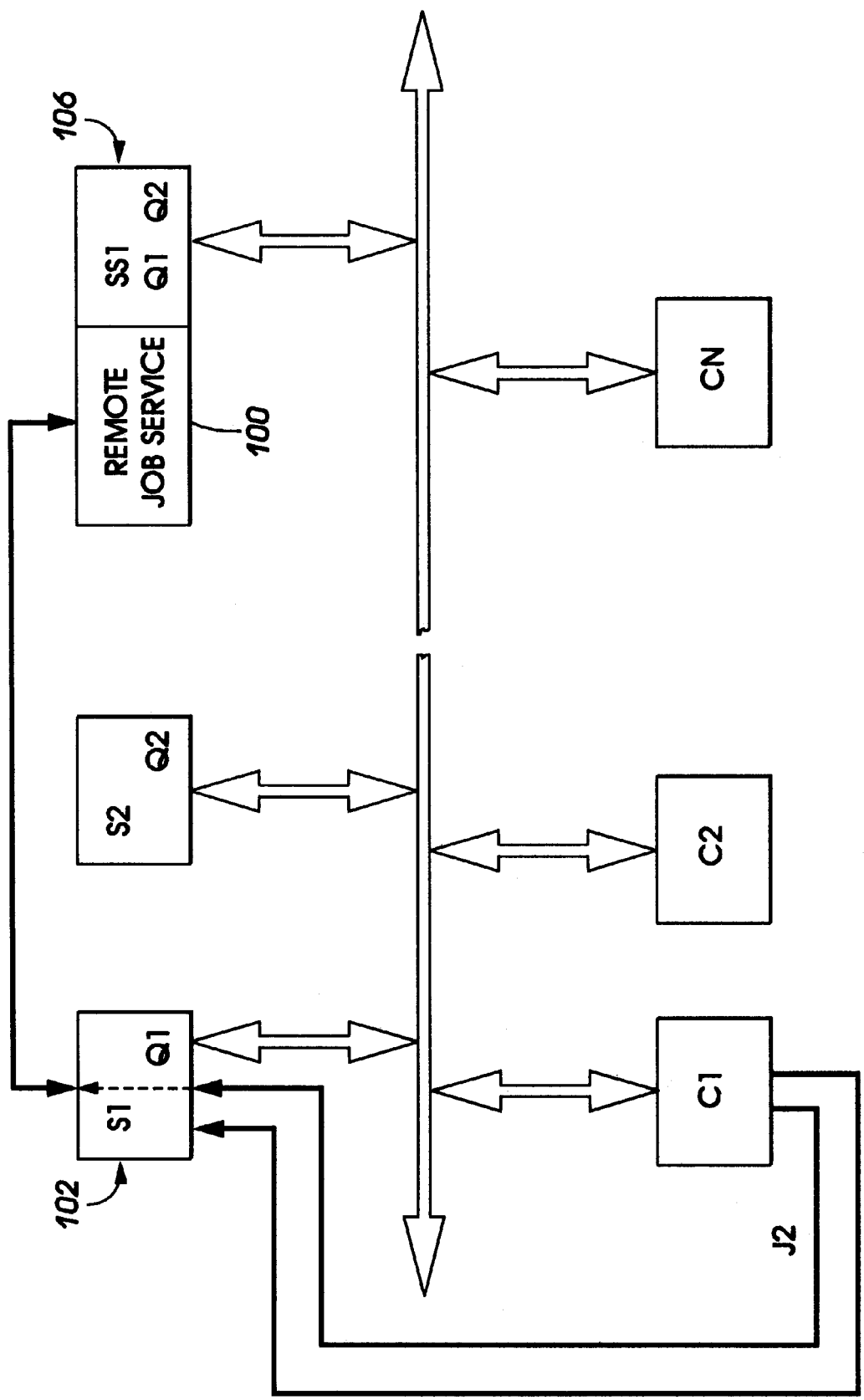
FIG. 5 is a block diagram including the LAN of FIG. 4 with a remote job service embodying the present invention.

Referring to FIG. 4, a conventional local area network, including a plurality of clients (C1, C2, . . . CN) communicating with one or more print servers adapted for use with low to medium volume printing systems (e.g. S1 and S2) and a server adapted for use with one or more high volume printing systems (e.g. SS1), is shown. In practice, a client (C1 in the example of FIG. 4) is required to transmit a job adapted for printing on a low to medium volume printing system (namely J1) to S1 and a job adapted for printing on a high volume printing system (namely J2) to SS1. In practice, both S1 and SS1 require configuration to accommodate the needs of C1. This situation causes resources in both S1 and SS2 to be configured for C1 even though C1 may only use SS2 on an infrequent basis. Referring to FIG. 5, an approach contemplated by the preferred embodiment permits transmission of J2 to S1 for routing of J2 to SS1 in a manner that is transparent to C1 and minimizes the configuring of SS1 for C1's particular needs. The approach of the preferred embodiment is accomplished through use of a Remote Job Service 100 (FIG. 6), the details of which will be described in further detail below. A discussion of the Remote Job Service follows:

OVERVIEW OF THE REMOTE JOB SERVICE

Figure 6:
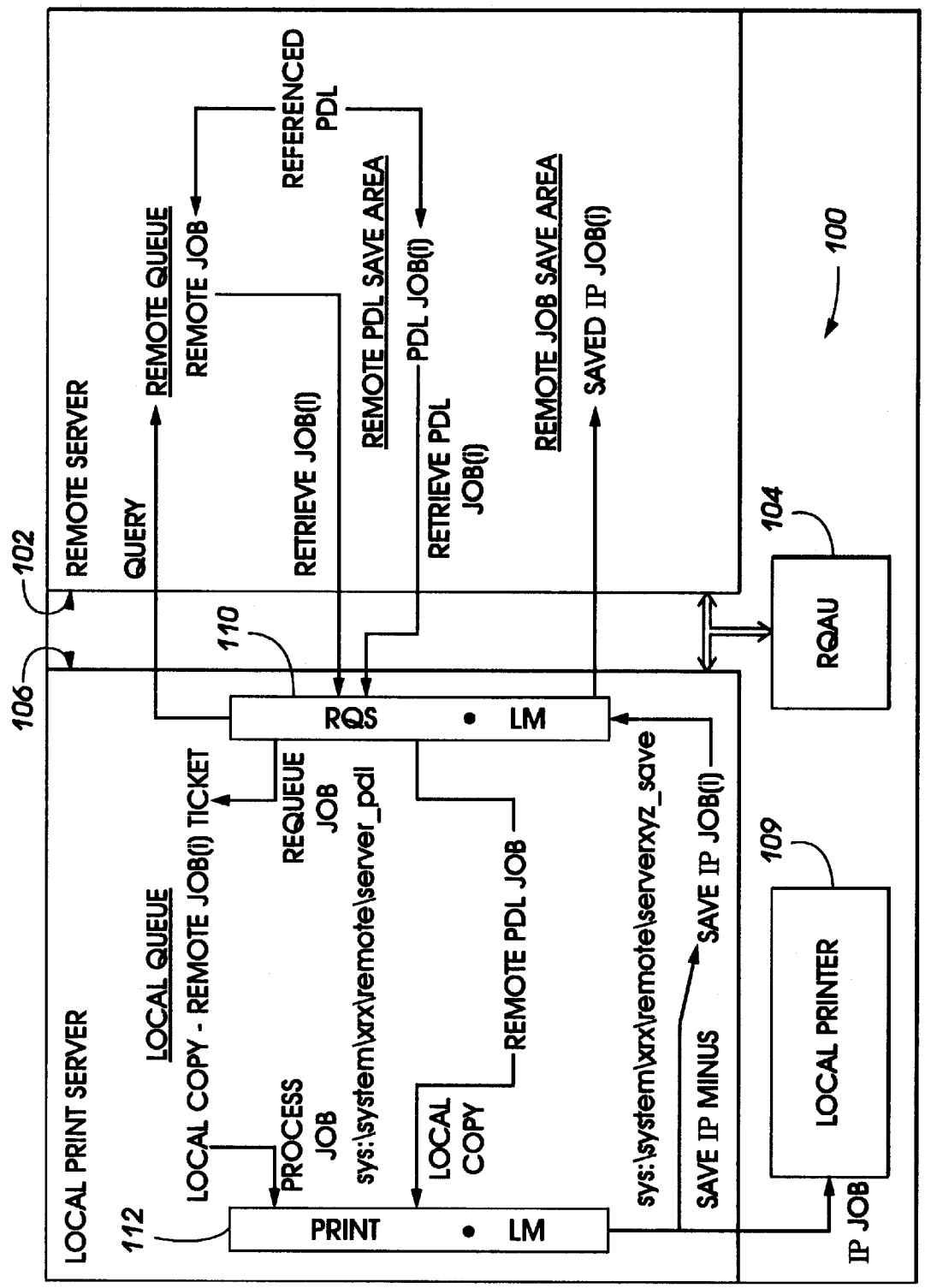
FIG. 6 is a block diagram including a suitable arrangement of components for implementing the remote job service.

Referring to FIG. 6, queues on a remote server 102 (FIG. 6) are connected, via a remote queue administration utility ("RQAU") 104 to local queues on a local server 106. Working directories are created on the local server to hold temporary job copies and PDL files from the remote server. In addition, a temporary directory is created to hold a print ready version of a processed job for shipping back to the remote server 102. For mapping queues of the remote server to queues of the local server, a configuration file 108 (FIG. 7) is created by and maintained with the RQAU 104.

In practice, jobs consisting of the following information, can be submitted to the remote server 102:

PDL data only (PostScript, HP/PCL, TIFF, Interpress, ASCII files) having DOS, MAC and NFS name spaces, File of Files referencing one or more PDL files stored on the remote server (desirably DOS name space), Xerox Documents on Demand (XDOD)/Xerox Image Print Path (XIPP) files referencing one or more TIFF image files stored on the remote Netware server (desirably DOS name space), Any of the above prepended with a job ticket for a local printing system (such as local printer 109), the local printing system being associated with the local server, and/or A job ticket referencing any of the preceding indicated PDL, File List or XDOD/XIPP files.

The local server includes a remote queue service loadable module ("RQS.LM") 110, preferably provided in the form of a Netware Loadable Module by Novell, Inc. ("Netware" is a trademark of Novell), including the following distinct functions The input side of the RQS.LM polls queues on remote servers, copies job files and any referenced PDL data files to temporary directories on the local server. Additionally, the RQS.LM modifies any attached job tickets to adjust both PDL source and save file destinations for pointing to local temporary directories.

The output side of the RQS.LM periodically examines one of the temporary output directories on the local server, detects completed PDL (e.g. Interpress) files for return of a corresponding copy to the remote server All referenced files desirably reside in directories in which the user has rights. In order for the RQS.LM to obtain these rights, the associated software will, in one example, assume the rights of the client via a queue management call ("QMS") of the type used in Netware. This also enables the RQS.LM to return saved files to the appropriate remote server directories. The local server preferably remains attached to a remote queue for retaining client rights to return saved jobs.

ADMINISTRATION AND INSTALLATION

The RQAU (FIG. 6) actually performs several different but related functions. The first function of this software is to install and accomplish initial setup of the remote service implementation. This includes creating the configuration file (FIG. 7) and mapping queues of the remote server with queues of the local server. Preferably, a server directory (sys:\system\xrx\remote) is created with accessibility granted only to the local server. The RQAU supports all further updates and reinstalls—this includes subsequent versions and enhancements.

In one example, a Novell Pconsole utility is used to create native print queues. Queue priorities are used in both the remote queues and the local queues. This means a queue on the remote server could be assigned a priority of 1 and mapped to a queue on the local server with a queue being assigned a priority of 10. Accordingly, a job would be serviced at the highest priority by the RQS.LM but, upon entering a queue of the local server, would be handled at a lower priority. The RQAU incorporates those options necessary to enable the use of client utilities from the remote servers.

REMOTE QUEUE SERVICE NETWORK LOADABLE MODULE

Figure 8:
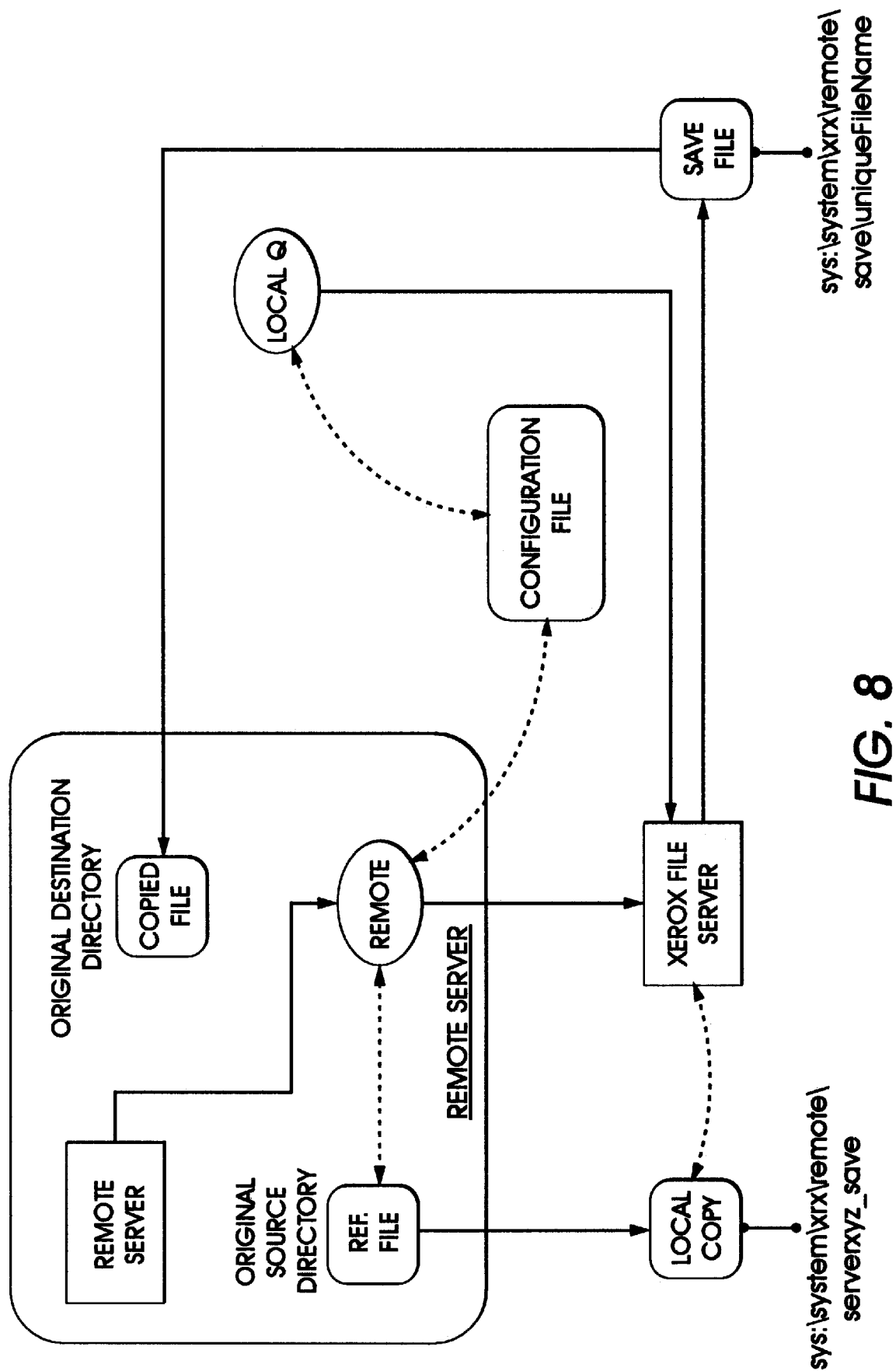
FIG. 8 is a block diagram illustrating, in part, the queue processing scenario contemplated for use with the remote job service.
Figure 9:
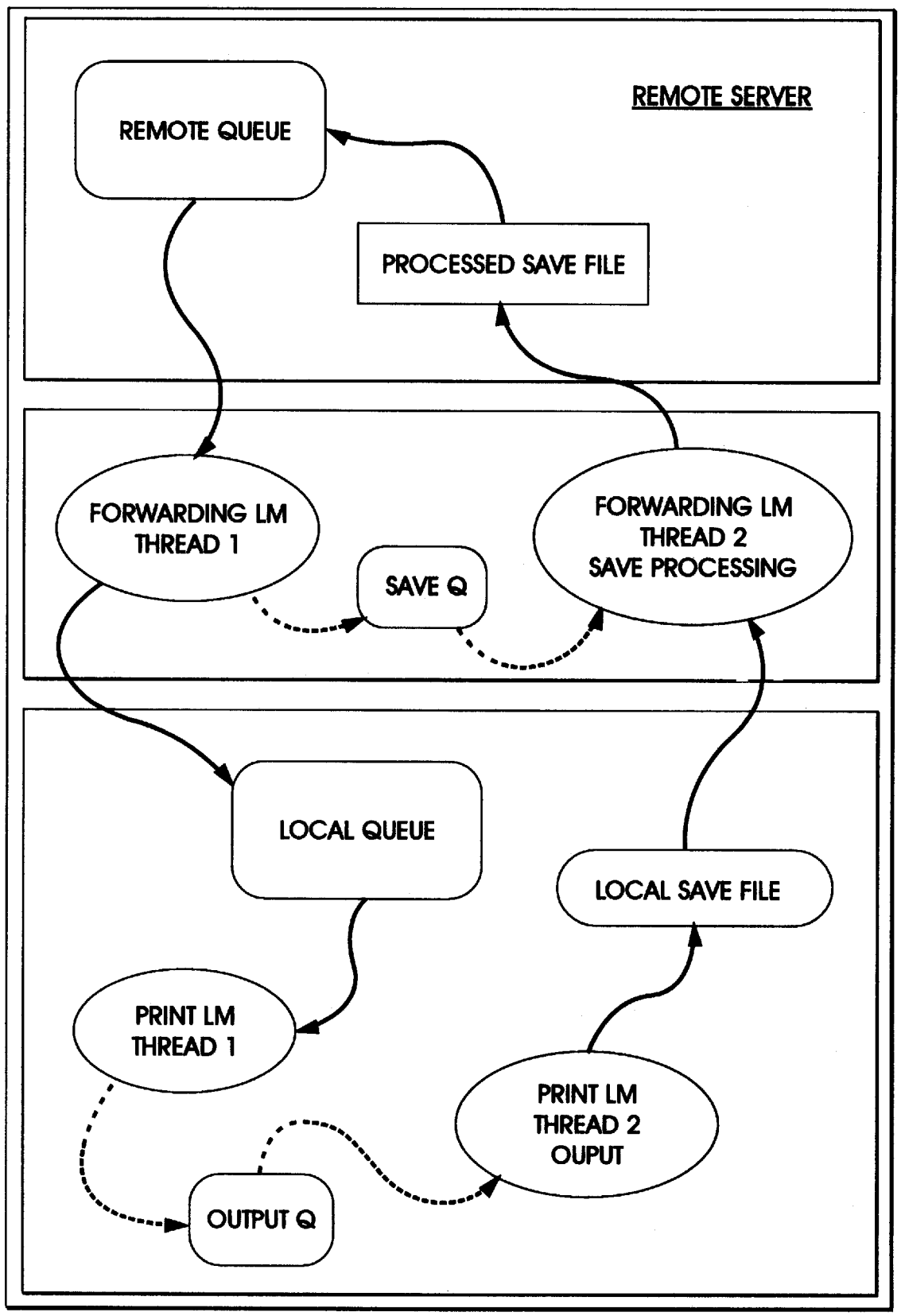
FIG. 9 is a block diagram illustrating the various stages through which a job progresses in accordance with the functionality of the remote job service.

Referring to FIGS. 8 and 9, the RQS.LM, which has an initialization mode, a job process mode, and an unload mode, spawns a second thread to process save jobs.

During the initialization mode, a queue of queues is built dynamically on the local print server with the queue of queues being built by parsing a configuration file having a format of the type shown in FIG. 7. Preferably, the configuration file contains all of the mappings necessary to transport desired job copies between the local server and the remote server. Referring specifically to FIG. 8, further illustration regarding the tying of at least one of the queues of the remote server to at least one of the servers of the local queues is provided. Since the queue built in the local print server is built dynamically, the number of queues that can be created is only limited by the amount of available RAM in the memory pools of the local print server. In the illustrated embodiment, only queues registered in the configuration file are serviced. Since the configuration file is examined when the RQS.LM is loaded, changes in the configuration file take effect upon the loading of the RQS.LM.

Referring briefly to the exemplary configuration file of FIG. 7, which file is claimed as copyrighted subject matter of Xerox Corporation, a brief listing of the terms employed therein is provided below. Each line below is couched in the following format: Term: Explanatory Note.

%% Begin: 1.01: Execute Version No. 1.01

%% Server ID: 99999_NumericaAUassignedNumber: Includes Unique Server Identifier

%% XeroxServerName: ServerNameUpTo45Chars: Network DocuTech ("DocuTech" is a trademark of Xerox, Corp.) File Server Name %% XeroxPrintServerName: PrintServerName: Novell Name of Network DocuTech Print Server %% ServerName: ServerNameUpTo45Chars: File Server Name of Remote File Server %% RemoteQ: NovellQname: Queue on Remote File Server to be linked with DocuTech Network Server %% QueuePriority: Named Queue's Priority %% LocalQ: NovellQname: Name of Queue on DocuTech Network Server In practice, the second thread is started in the initialization phase (FIGS. 8 and 9), and a resulting task communicates via an internal queue (similar to an output queue of PRINT.LM 112 of FIG. 6). Information pertaining to saved jobs is queued in a "save queue" and the corresponding save queue is polled with the second thread. When a node is available in the save queue the RQS.LM will poll a sys:\system\xrx\remote\save directory in the save queue for a save file. When the save file appears the RQS.LM will move it back to the destination directory on the remote server (FIG. 9). When a save file or job is detected a QMS record will be kept in the suitable queue of the remote server until the save file is moved back to an appropriate destination directory. The above-described saving approach permits client rights to be obtained for saving the job on the remote server.

In the processing phase the queues are polled highest priority first. Preferably, there is a list of one or more queues associated with each stated priority. In one example, a lower priority list is not polled until each higher priority queue has been emptied. This process could 'starve' the lower priority queues if the higher priority queues were always full. To avoid "starving" of jobs in lower priority queues of the local server, the list of queues at each priority is polled in a round robin fashion. This ensures that all the queues, at a particular priority level, will be given an even chance to be serviced. In the event that all queues are empty the thread will "sleep" a small amount of time. With each sweep of empty queues the sleep time grows, until a selected maximum sleep time, e.g. six seconds, is reached. When a job is placed in any of the queues the sleep time is set back to an initial time and the process is restarted.

Actual processing of a job commences once it has been received from the remote queue. In one example, a job ticket is parsed and all pertinent referenced files are copied to a preselected directory, such as sys:\system\xrx\remote\server_pdl. The source and destination references are changed to this preselected directory for further processing. If a job is a "save job", then a destination directory will point to a save directory. In one example the local server includes a queue into which a job ticket, modified in accordance with the preferred technique, is placed. Save jobs are preferably subjected to a step for creating a node in the queue to the second thread. In the case of a 'native' Novell job, that is a job placed in a Novell queue with no job ticket, it is contemplated that the RQS LM will simply place the job, as is, into an appropriate queue of the local server.

Another type of job that can be received by the local server is referred to as a "File of Files (FOF)". This is a job created with a defined set of commands which permits the building of a print job with multiple files. In the event of parsing a job ticket which relates to a FOF, remote files are copied to the local server into a temporary directory and the FOF job ticket is modified to reflect the new residence of the files.

Yet another type of job that can be contemplated in accordance with the technique of the preferred embodiment is a Xerox Image Print Path (XIPP). This file type, as with the FOF, contains a list of files to be retrieved from one or more remote servers. Preferably, a temporary subdirectory can be created for the files so that they can be subsequently copied thereto. The XIPP list will be modified to indicate the new home of the files and a record will be put in the new Job Ticket indicating that the temporary subdirectory and it's files should be deleted upon completion of the job.

COMPREHENSIVE DISCUSSION OF JOB SERVICE FUNCTIONALITY

Figure 10:
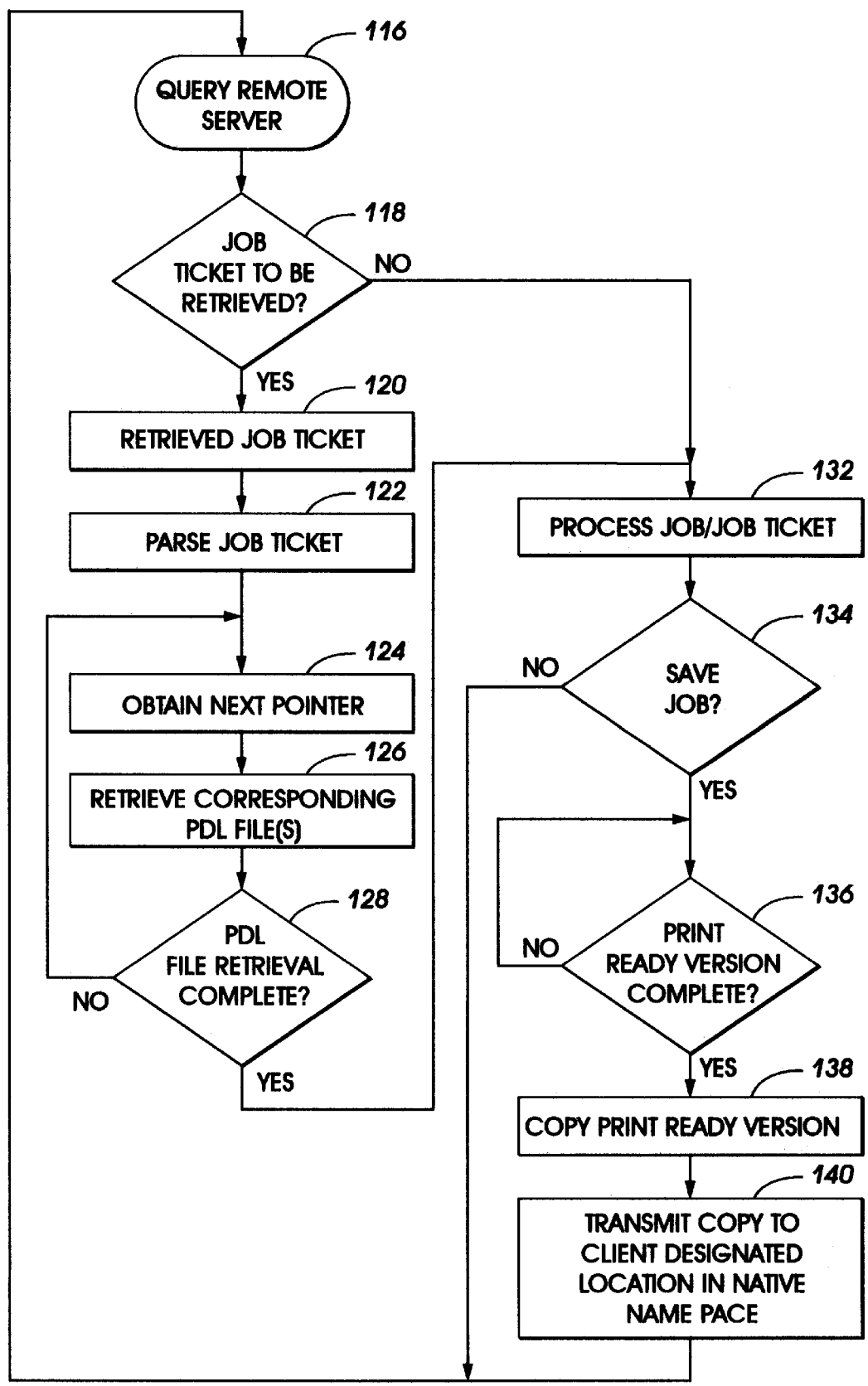
FIG. 10 is a flow diagram illustrating the functionality of the remote job service.

Referring to FIGS. 5, 6 and 10 a comprehensive discussion of the procedure for implementing the remote job service technique of the preferred embodiment is provided. Initially, at step 116, the RQS.LM 110 queries the remote server 102 to determine if a job intended for processing at the local server 106 resides in the remote queue. The preferred technique contemplates that a job can be retrieved directly or by reference to a retrieved job ticket. For the case in which no job ticket is retrieved, the process skips to step 132 and the job is processed in accordance with default settings provided by the local print server.

In response to a positive answer for the query 118, a job ticket (referred to as "JOB(i)" in FIG. 6) is retrieved by the RQS.LM (step 120) and parsed thereby (step 122). Pursuant to processing the job ticket, one or two pointers are, via step 124, obtained. As illustrated in FIG. 6, the "REMOTE JOB" is referenced to a single job, namely "PDL JOB(i)". Hence the pointer obtained with step 124 accommodates for the retrieval of PDL JOB(i) at step 126. That is, using the pointer obtained at step 124, the RQS.LM retrieves the file corresponding with PDL JOB(i).

In another contemplated aspect of the preferred embodiment, however, a plurality of pointers, referencing a plurality of jobs (some even possibly residing at remote servers other than remote server 102 are obtained. In the case where the job is an FOF, or comparable job, a negative answer would initially be obtained to the query of step 128 and the process would loop back to step 124 as many times as necessary to obtain the multiple files called for by the list of the FOF.

After one or more files supporting the job have been retrieved by the RQS.LM, the job, with its corresponding job ticket, is processed, via step 132, by the PRINT.LM. In one example, the job is placed into a print ready format in accordance with the teaching of now allowed U.S. patent application Ser. No. 08/068,724, the disclosure of which is incorporated herein by reference, in which a PCL or PostScript job is "wrapped" in Interpress for processing at a Network DocuTech ("DocuTech" is a trademark of Xerox, Corp.) Printing System. Nevertheless, it should be appreciated that the technique of the preferred embodiment is just as applicable to a print service that simply RIPs a PCL/PostScript job as it is to a print service that wraps a job written in one PDL into another PDL.

Assuming that the job processed by the PRINT.LM need not be saved (see step 134), then the process returns to step 116 so that RQS.LM 110 can query the remote server 102 to determine if another job is queued for processing. On the other hand, if a save job, i.e a copy of the print ready version of the job generated by PRINT.LM, is to be provided to the remote server, then the RQS.LM 110, via step 136, "looks" for the print ready version of the job to be completed. In the illustrated embodiment of FIG. 6, the RQS.LM will poll the directory sys:\system\xrx\remote\save until it determines that the version resides therein. Once a copy of the print ready version (step 138) resides in this directory, the RQS.LM makes a copy of the print ready version and transmits the same to the remote server with a file specification corresponding to the native name space of the client to whom the job belongs(step 140).

Numerous features of the above described preferred embodiment will be appreciated by those skilled in the art:

First, when a user is already configured to use a first print server, the technique of the preferred embodiment obviates the need for the user to be configured with respect to a second print server. Essentially, using the above-disclosed technique, the user sends a job intended for processing on the second ("local") print server to the first ("remote") print server, and the job is routed to the local print server in a manner that is transparent to the user. This saves resources with respect to the local server because the user need only be configured for use on the remote server.

Second, the preferred technique provides an implementation for saving jobs processed on the local server in a manner that is transparent to the user. Desirably, a save job is transmitted to the remote server in the native name space typically employed by the user. In this way, the user is able to locate the save job readily when the user wishes to have operations performed on the underlying job. Moreover, since the job is saved in a print ready format, the user is not necessarily required to RIP the job a second time. Accordingly, assuming the user simply wishes to print the save job, a copy of the save job can be transmitted from the remote server to the local server for execution with a minimum amount of processing.

Third, through use of a "File of Files" multiple jobs can be processed as if they were part of a single job. That is, in one example, a list of files is provided by the remote server to the local server and, in turn, the local server retrieves the listed jobs via the network. In one example, the listed files can exist at multiple remote servers.

Fourth, an advantageous approach to managing the local and remote servers is provided. Through use of a suitable utility, a mapping is achieved between the queues of the local and remote queues. Comprehensive control of the mapping is accomplished with an appropriate configuration file. Moreover, suitable prioritization of job execution at the local server insures that jobs are processed in a timely manner.

What is claimed is:

1. In a network printing system with a first document job server communicating with a second document job server by way of a network, a document job being provided to the first document job server and a document processing system communicating with the second document job server by way of the network, an improvement comprising:

multiple first job queues communicating with the first document job server, wherein one of the multiple first job queues is selected for storing the document job;

a first module communicating with the one of the multiple first job queues of the first document job server for retrieving a copy of the document job from the selected one of the multiple first job queues in response to a determination, by said first module, that the document job resides in the selected one of the multiple first job queues;

a second job queue communicating with the second document job server for receiving the retrieved document job copy, wherein the selected one of the multiple first job queues is mapped with the second job queue so as to tie the selected one of the multiple first job queues with the second job queue; and a second module communicating with both said first module and the document processing system, said second module creating a print ready version, from the copy of the document job, for submission to the document processing system.

2. The improvement of claim 1, wherein one of the first document job server and the second document job server includes a plurality of queues with a priority order being assigned to the plurality of queues.

3. The improvement of claim 1, further comprising a utility for mapping the one of the first queues with the one of the second queues.

4. The improvement of claim 1, in which the second document job server includes multiple queues and the printing system includes a third document job server communicating with said first module, and in which a second document job is provided to the third document job server, wherein said first module places the document job into a first one of the multiple queues and the second document job into another of the multiple queues.

* * * * *